United States Patent [19]

Polak et al.

[11] Patent Number: 4,797,185

[45] Date of Patent: Jan. 10, 1989

[54] HYDROGEN SEPARATION AND ELECTRICITY GENERATION USING NOVEL ELECTROLYTE MEMBRANE

[75] Inventors: Anthony J. Polak, Lake Zurich; Sandra Petty-Weeks, Naperville, both of Ill.

[73] Assignee: Allied-Signal Inc., Morristownship, Morris County, N.J.

[21] Appl. No.: 70,620

[22] Filed: Jul. 6, 1987

Related U.S. Application Data

[63] Continuation of Ser. No. 756,889, Jul. 19, 1985, abandoned, which is a continuation-in-part of Ser. No. 687,351, Dec. 28, 1984, abandoned.

[51] Int. Cl.⁴ .................... C25B 1/02; C25B 9/00
[52] U.S. Cl. .................... 204/129; 204/252; 204/277; 204/278; 429/33; 429/192
[58] Field of Search ............ 204/129, 130, 252, 277, 204/278, 421, 422, 424, 425, 426, 427, 1 T; 429/30, 33, 192

[56] References Cited

U.S. PATENT DOCUMENTS

| | | | |
|---|---|---|---|
| 2,913,511 | 11/1959 | Grubb, Jr. et al. | 429/30 |
| 3,247,133 | 4/1966 | Chen | 204/296 |
| 3,265,536 | 8/1966 | Miller et al. | 204/296 |
| 3,275,575 | 9/1966 | Fogle | 204/296 |
| 3,276,598 | 10/1966 | Michaels et al. | 204/296 |
| 3,276,989 | 10/1966 | Nishihara et al. | 204/296 |
| 3,489,670 | 1/1970 | Maget | 429/41 X |
| 3,528,858 | 9/1970 | Hodgdon, Sr. et al. | 429/33 |
| 4,024,036 | 5/1977 | Nakamura et al. | 204/295 |

OTHER PUBLICATIONS

The Condensed Chem. Dictionary, Ninth Editon, Van Nostrand Reinhold Co., p. 583

Hackh's Chem. Dictionary, Fourth Edition, McGraw-Hill Book Co., p. 431.

The Condensed Chemical Dictionary, Ninth Ed., G. Hawley, Van Nostrand Reinhold Co., 1977, pp. 11, 679–680.

*Primary Examiner*—John F. Niebling
*Assistant Examiner*—Nam X. Nguyen
*Attorney, Agent, or Firm*—Thomas K. McBride; Harold N. Wells

[57] ABSTRACT

Apparatus and method for performing an electrochemical process involving hydrogen and gaseous compounds capable of dissociating into or combining with hydrogen ions using a solid electrolyte concentration cell. Specific applications are fuel cells for producing an electrical current and separation of hydrogen from a gaseous mixture. A novel solid electrolyte membrane is used which comprises an organic polymer-inorganic compound blend prepared by admixing an organic polymer such as poly(vinyl alcohol) with a phosphoric acid in a mutually miscible solvent. For increased strength, a membrane may be composited with or attached to a porous support. In one embodiment, the membrane may be formed into a hollow fiber having electrically conductive particles with catalyst embedded in the fiber walls; a multiplicity of such fibers may be used to form a hydrogen separation device.

17 Claims, 2 Drawing Sheets

4,797,185

HYDROGEN SEPARATION AND ELECTRICITY GENERATION USING NOVEL ELECTROLYTE MEMBRANE

CROSS REFERENCE TO RELATED APPLICATION

This is a continuation application of pending application Ser. No. 756,889, filed on July 19, 1985, which is a continuation-in-part of application Ser. No. 687,351, filed Dec. 28, 1984, all abandoned.

FIELD OF THE INVENTION

This invention relates to an electrochemical process involving movement of protons through a membrane and applications thereof. More specifically, it relates to the use of a novel solid electrolyte and a catalyst in electrochemical processes such as producing electricity from hydrogen or gases capable of dissociating to yield hydrogen ions or in removing hydrogen from a gaseous mixture having a component capable of dissociating to yield hydrogen ions. The solid electrolyte may be formed by blending an inorganic compound and an organic polymer or by compositing a membrane comprising these components with a porous support. This invention also involves the use of hollow fibers comprised of this membrane and electrically conductive particles with catalyst for hydrogen separation.

INFORMATION DISCLOSURE

U.S. Pat. No. 4,024,036 (Nakamura et al.) describes a proton permselective solid state member capable of exhibiting ionic conductivity.

U.S. Pat. Nos. 3,265,536 (Miller et al.), 4,306,774 (Nicholson), 3,276,910 (Grasselli et al.), and 4,179,491 (Howe et al.) deal with substances capable of conducting hydrogen ions.

An article by Lundsgaard et al. (Solid State Iopnics 7, 1982, NorthHolland Publishing Co.) describes experiments done using a substance which conducts hydrogen ions.

A survey article on the separation of hydrogen may be found in the October 1983 *Platinum Metals Review*, produced by Johnson Matthey, London. Membrane separation systems are treated on page 63 and following of the July 13, 1981 issue of *Chemical Engineering*.

A selection of U.S. Pat. Nos. dealing with hydrogen separation are 4,313,013 (Harris), 2,824,620 (deRosset), 2,958,391 (deRosset), 3,499,265 (Langley et al.), and 3,401,099 (McEvoy).

A survey article on hollow fiber membranes may be found in *Encyclopedia of Polymer Science*, Vol. 15, p. 258. Other references of interest in regard to fabrication of hollow fibers are U.S. Pat. No. 3,724,672 (Leonard et al.) and an article in *Journal of Applied Polymer Science*, Vol. 20, p. 2377, John Wiley & Sons.

A survey article on fuel cells may be found in *Journal of the Electrochemical Society*, March, 1978, p. 77C.

BRIEF SUMMARY OF THE INVENTION

The present invention provides methods and apparatus for hydrogen separation and electricity production. A novel solid electrolyte membrane is used in the present invention. I have discovered that a macroscopically homogenous thin film polymer-blended membrane may be fabricated by admixing sulfuric acid or a phosphoric acid with an organic polymer which is at least partially compatible with said acid to form a polymer-blend composition of matter which is useful in electrochemical processes. This membrane is capable of acting as a proton conductor in a fuel cell or hydrogen separation system where a hydrogen compound yields protons on one side of the membrane, protons are transported through the membrane, and protons are combined with a substance on the other side.

In addition, the composition of matter utilized for said membrane may be composited on a porous support to form a composite membrane which possesses increased strength as well as being a protonic conductor. Examples of material used for such porous support include glass cloth, polysulfone, and ceramics.

The invention utilizes a concentration cell whose electrolyte is said membrane or composite membrane. A membrane is mounted in a membrane housing having a first gas chamber and a second gas chamber, which chambers are separated by a partition comprising the membrane. Molecular transport through the membrane may be sufficiently slow so that gases will not mix by diffusing through it. Temperature of the gas or gases and/or the membrane housing may be controlled at a previously established value. A portion of catalytic agent for promotion of dissociation or combination is in intimate contact with the membrane on the membrane surface in common with the first gas chamber and also on the surface exposed to the second gas chamber. It is not necessary that the same catalytic agent be used on both sides. Means for forming electrical contact and transferring electrons to and from an external circuit are provided on each side of the electrolyte in intimate contact with catalytic agent. The catalytic agent may be platinum, palladium, or alloys thereof. The catalytic agent may be electrically conductive.

The method of a broad embodiment of the invention may be stated as a method for accomplishing an electrochemical process involving a gaseous mixture having a component which is capable, in the presence of a catalytic agent, of dissociating to yield hydrogen ions, such method comprising contacting said gaseous mixture with a first surface of a thin polymer-blend membrane and forming an electrical connection between two separate portions of catalytic agent effective to promote dissociation and combination, where a first portion of catalytic agent is in contact with said first surface and a second portion of catalytic agent is in contact with a second surface of said membrane, which membrane isolates said gaseous mixture from a second gas comprising hydrogen compounds formed at said second portion of catalyst, and which membrane has said second surface exposed to the second gas, said membrane comprising a blend of a compound selected from the group consisting of phosphoric acids and sulfuric acid and a polymer which is compatible with said compound.

It is among the objects of the present invention to provide an improved fuel cell utilizing a fuel gas comprising hydrogen or a gaseous component capable of dissociating into hydrogen ions. The first and second chambers of the membrane housing serve as a fuel gas chamber and an oxidant gas chamber. The fuel gas chamber contains a gas comprising hydrogen or a component capable of dissociating to form hydrogen ions. In the other chamber is an oxidant gas, such as a gas comprising oxygen, which combines with hydrogen ions which have passed through the membrane.

It is also among the objects of the present invention to provide methods and apparatus of separating hydrogen from a gaseous mixture containing hydrogen or a component capable of dissociating to yield hydrogen ions. Practice of the invention may be viewed as resulting in purification of the mixture by removal of hydrogen, purification of hydrogen, or addition of hydrogen to another gas. The first and second chambers of the membrane housing serve as a pure gas chamber and a mixture gas chamber. The term pure gas, as used herein, means hydrogen separated from the gas mixture along with whatever gas, if any, is in the pure gas chamber with the separated hydrogen.

The membrane may be in the form of tubing, or hollow fibers, having electrically conductive particles embedded in it such that each particle is exposed to the atmosphere existing both on the exterior and interior of the tubing. A gaseous mixture is contained on the inside of the tubing and pure gas is on the outside, isolated from the gaseous mixture by the tubing wall. Alternatively, gaseous mixture may be on the outside and pure gas on the inside. A catalytic agent for promotion of dissociation or combination is in intimate contact with the particles on both sides of the membrane. It is not necessary that the same catalytic agent be used on both sides. The electrically conductive particles replace the external circuit of the concentration cell; that is, electrons from the gaseous mixture side of the tubing travel through the particles to combine with hydrogen ions passing through the membrane at the catalyst on the surface of the particles in common with the pure gas side of the membrane.

BACKGROUND OF THE INVENTION

Figure 1:
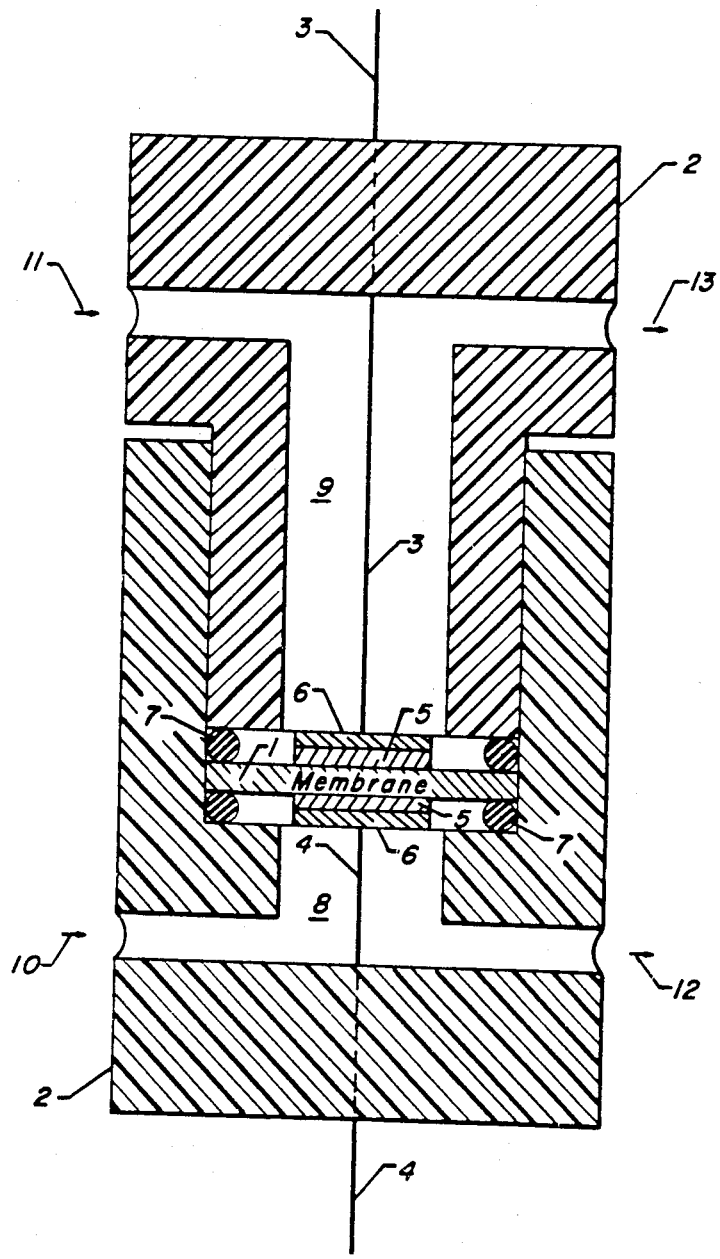
FIG. 1 is a schematic representation, in cross-section, of a test sensor used in initial proof of principle experimentation. The drawing is not to scale.

The present invention utilizes a solid electrolyte membrane in separation of hydrogen and production of electricity (a fuel cell). The Nernst equation describes the behavior of such a system, as follows. When two media with different partial pressures, $P_1$ and $P_2$, of a particular substance present in both media are separated by a solid electrolyte (ionic conductor) and conducting electrodes are attached to both sides of the ionic conductor, an EMF is generated which is related to the partial pressures as follows:

$$EMF = E_o + \frac{RT}{nF} \ln \frac{P_2}{P_1},$$

where R is the gas constant, T is absolute temperature, F is the Faraday constant, $E_o$ is the standard oxidation-reduction potential difference, EMF is electromotive force, and n is the number of electrons per molecule of product from the overall cell reaction.

If the system described by the above equation behaves nonideally, the partial pressures must be replaced by fugacities. Another factor which may need to be considered in regard to a particular system is the rate of dissociation to form the ions which pass through the solid electrolyte. This may be a limiting factor to the transfer of ions through the electrolyte. The rate of dissociation can be calculated by means of the equilibrium constant for the dissociation reaction.

In a majority of cases, the admixture of an organic compound, especially in a polymeric state, with an inorganic compound, results in a phase separation, due to the fact that the two systems are immiscible in nature. However, we have discovered that a macroscopically homogeneous thin film polymer-blend membrane may be fabricated by admixing the organic and inorganic components discussed herein; the resulting substance is not merely a physical mixture, but exhibits a degree of interaction, that is, some amount of chemical interaction exists. Substances which are permeable by gases in a selective manner are known and utilized in a variety of applications. A membrane formed in accordance with the present disclosure is substantially impermeable to ions and gases, including hydrogen gas, but does allow hydrogen ions to pass through it. It should be noted that the membrane is not expected to be totally impermeable and that substances in addition to hydrogen ion may pass through it. Permeability experimentation has not been done, except to the extent indicated herein. For background information relating to the principles of the present invention, reference may be made to the book *Solid Electrolytes and Their Applications*, edited by Subbarao, Plenum Press, 1980.

Low mechanical strength has been a common problem when attempting to apply permselective membranes. The present invention provides a membrane whose mechanical strength is increased by compositing it with other materials, but whose desirable properties are not lost as a result of doing so.

In a simple hydrogen-oxygen fuel cell, the fuel gas is hydrogen and the oxidant gas is oxygen. Hydrogen dissociates into hydrogen ions and electrons at the catalyst on the fuel gas side of the membrane. The hydrogen ions pass through the electrolyte element while the electrons flow through the external circuit, doing electrical work before forming water by combining with, at the catalytic agent on the oxidant gas side of the membrane, hydrogen ions which passed through the membrane and oxygen. A flow of gases is normally maintained for continuous operation of the fuel cell. The maximum voltage which can be produced by a fuel cell is a thermodynamic function of the fuel and oxidant. For a hydrogen-oxygen fuel cell, the theoretical EMF is 1.23 volts. The actual voltage will be less due to losses within the cell. The current produced is controlled by such considerations as the rate at which the electrochemical reactions proceed, the electrolyte thickness, and the catalyst surface area. In a simple hydrogen-oxygen cell, the partial pressure term of the Nernst equation becomes partial pressure of water divided by the quantity partial pressure of hydrogen times square root of partial pressure of oxygen.

When producing hydrogen by means of the electrochemical process of the invention, the amount produced is generally in accordance with the parameters discussed above: the Nernst equation and, where applicable, the dissociation equilibrium constant. The rate at which separation takes place may be increased by adding means to generate an EMF to the external circuit.

That is, a difference in partial pressures is sufficient to provide the driving force for hydrogen ion transport through the membrane, but applying an externally generated driving force will increase hydrogen ion flux. In the practice of all embodiments of this invention, it should be noted that exact adherence to theoretical relationships is not required of commercially used methods and apparatus.

DETAILED DESCRIPTION OF THE INVENTION

As was mentioned above, in attempting to blend an organic polymer with an inorganic compound, the usual result is to obtain a phase separation. It has now been discovered that a useful blend may be obtained by admixing certain organic polymeric compounds with sulfuric acid or a phosphoric acid. The resulting composition of matter is formed into a thin film membrane which may be utilized in electrochemical systems such as gas separation processes and electric power production. The utility of these membranes in electrochemical systems is due to the fact that the membranes possess a high protonic conductivity, especially at room or ambient temperature.

Usually, high conductivity is observed in polymer complexes only when the temperature is above the glass transition temperature (Tg), that is, above the temperature at which the substance changes from a solid to a liquid (the melting point of a polymer is usually above its glass transition temperature). Indications of the change of a polymer from solid to liquid are abrupt changes in certain properties, such as coefficient of expansion and heat capacity. The polymer-blend compositions of the present invention exhibit high protonic conductivity at temperatures well below the observed glass transition temperatures of the individual homopolymers. A device utilizing an ion-conductive polymer must operate below the Tg of the polymer; the polymer is not usable at higher temperatures due to loss of strength, tackiness, etc. A polymer-blend of the present invention will exhibit two second order transition temperatures, which are attributable to the individual components. Note that the glass transition is a second order transition. A transition associated with a polymer in a blend of the present invention will occur at A different value than the transition temperature determined for that polymer when it is not mixed with any other substance. The transition temperature associated with the inorganic component depends on the polymer component in the blend. Thus, it may be appreciated that there is a degree of interaction between the components, that is, at least some chemical interaction exists between the components.

A distinct advantage which is possessed by the polymer-blend membranes of the present invention over other organic-inorganic blend membranes is that these membranes possess low resistivities (resistance times area divided by thickness), which are four to five orders of magnitude less than the other organic-inorganic blends.

The desired membrane comprises a blend of an organic polymer and a phosphoric acid or sulfuric acid, the polymer being at least partially compatible with the acid. Examples of organic polymers which may be employed as one component of the blend of the present invention will include poly(vinyl alcohol), also known as PVA, poly(vinyl fluoride), polyethylenimine, poly(acrylic acid), polyethylene glycol, cellulose acetate, phenol formaldehyde resins, poly(vinyl pyrrolidone), poly(ethyloxazoline), poly(acrylamide), poly(N-isopropyl acrylamide), poly(N,N-dimethyl acrylamide), poly(vinyl 4-pyridine), polyimide, poly(vinyl sulfonic acid), etc. Further examples of organic polymers which may be employed include copolymers having monomer units of these exemplary polymers. In terms of monomer repeat units, the polymer-blend membrane comprises a polymer selected from a group of polymers made from 2-ethyl-2 oxazoline or a polymer or copolymer having repeat units selected from a group comprising hydroxyethylene, vinyl fluoride, ethyleneimine, acrylic acid, ethylene glycol, cellulose acetate, acrylamide, N-isopropyl acrylamide, N,N-dimethyl acrylamide, 4-pyridylethylene, imide, vinyl sulfonic acid, N-pyrrolidonylethylene, and polyphenolic structures such as phenol formaldehyde resins.

The other component of the organic-inorganic blend will comprise a phosphoric acid or sulfuric acid. Examples of acids which may be employed will include hypophosphoric acid, metaphosphoric acid, orthophosphoric acid, pyrophosphoric acid, polyphosphoric acid, or sulfuric acid. The sulfuric acid which is employed will comprise an aqueous sulfonic acid which may contain from about 10% to about 40% sulfuric acid in aqueous solution. It is to be understood that the aforementioned organic polymers and phosphoric acids or sulfuric acid are only representative of the class of components which make up the membrane blends used in the present invention.

The novel compositions of matter used in the present invention are prepared by admixing the two components of the blend in a mutually miscible solvent at solution conditions for a period of time sufficient to form the desired blend. In the preferred membrane the mutually miscible solvent which is employed to dissolve the components comprises water, although it is contemplated within the scope of this application that any other mutually miscible solvent, either inorganic or organic in nature may also be employed. The mixing of the two components of the composition of matter may be effected at solution conditions which will include a temperature in the range of from about ambient (20°–25° C.) up to the boiling point of the mutually miscible solvent which, for example, in the case of water is 100° C. As an example poly(vinyl alcohol) and orthophosphoric acid may be placed in a flask and dissolved in water which has been heated to 100° C. The blend is cast upon a suitable casting surface which may consist of any suitable material sufficiently smooth in nature so as to provide a surface free of any defects which may cause imperfections on the surface of the membrane. Examples of suitable casting surfaces may include metals such as stainless steel, aluminum, etc., glass, polymer or ceramics. After casting the solution upon the surface, the solvent is then removed by any conventional means including natural evaporation or forced evaportion by the application of elevated temperatures whereby said solvent is evaporated and the desired membrane comprising a thin film of the polymeric blend is formed. The thickness of the film can be controlled by the amount of phosphoric or sulfuric acid and/or polymer which is present in the reaction mixture. The thin film organic-inorganic blend which is prepared according to the process of the present invention will possess a thickness which may range from about 0.1 to over 500 microns and preferably from about 20 to about 60 microns.

The amounts of phosphoric or sulfuric acid and organic polymer may vary over a relatively wide range. For example, the acid may be present in the blend in a range of from abut 1% to about 70% by weight of the blend while the organic polymer may be present in an amount in the range of from about 99% to about 30% by weight of the blend. Whenever a composition is expressed herein, it is to be understood that it is based, in the case of polymers, on the monomer repeat unit.

Examples of novel thin film polymer blends which may be prepared according to the process of this invention will include poly(vinyl alcohol)-orthophosphoric acid, poly(vinyl fluoride)-orthophosphoric acid, cellulose acetate orthophosphoric acid, polyethylene glycol-orthophosphoric acid, poly(vinyl alcohol)-pyrophosphoric acid, poly(vinyl fluoride)-pyrophosphoric acid, cellulose acetate-pyrophosphoric acid, polyethylene glycol-pyrophosphoric acid, poly(vinyl alcohol)-metaphosphoric acid, poly(vinyl fluoride)-metaphosphoric acid, polyethylene glycol-metaphosphoric acid, poly(vinyl alcohol)-sulfuric acid, poly(vinyl fluoride)-sulfuric acid, cellulose acetate-sulfuric acid, polyethylene glycol-sulfuric acid, etc.

It is to be understood that the aforementioned list of polymer blends is only representative of the class of polymer blended membranes which may be prepared and that the invention is not necessarily limited thereto.

It will be helpful in gaining an understanding of the invention to examine initial proof of principle experimentation. The information presented in regard to this experimentation is not meant to limit the scope of the invention in any way. This experimentation was directed to obtaining information on gas detection, as well as the specific applications described above.

Several samples of a novel polymer blend membrane were prepared by dissolving 0.25 gram of poly(vinyl alcohol) and 0.1 ml of 14.7M orthophosphoric acid in boiling deionized water, the amount of organic polymer and acid being sufficient to impart a 63/37 weight percent ratio to the resulting polymer blend membrane. The molecular weight of the PVA was 76,000. Commercially available PVA of molecular weight 3,000 or 133,000 could have been used, as it was in preparing other samples. The solution was then poured into an evaporation dish and the water was allowed to evaporate for a period of 18 hours. The resulting film was transparent and possessed a thickness of 30 microns.

A thin film membrane was cut into a disc having a 1" diameter to form membrane 1 of FIG. 1 and platinum was sputter-deposited onto both sides of the disc. The deposited platinum discs each had a thickness of about 400 Angstroms and a diameter of about 1 cm. Deposition was accomplished by means of a Hummer II sputter deposition system supplied by Technics Co. A biased screen between the target and film was used to reduce the electron flux to the membrane. There are many alternative methods which could have been used to form the platinum deposits, such as thermal evaporation or deposition by means of an ink. The porous structure of sputter-deposited catalytic agent is helpful in facilitating spillover of hydrogen ions onto the membrane, but it is not required. Note that hydrogen will migrate through solid platinum.

Referring to FIG. 1, membrane 1 was mounted in test fixture 2, which may also be referred to as a sample cell, membrane housing, or test sensor. The above mentioned platinum deposits 5 served as catalytic agent to promote dissociation and reassociation or combination. Electrical contact was made to the platinum through copper platens 6, which were held in place by springs (not shown) extending between the platens and interior surfaces of the sample cell. Platens 6 did not cover the entire surface of the catalytic agent, though FIG. 1 shows this to be the case. Note that when the catalytic agent is electrically conductive and not discontinuous, electrical contact need be made only at one point, the catalytic agent thus serving as an electrode. Wire leads 3 and 4 extended from the platens out of the test fixture through means for sealing against gas leakage (not shown). Leads 3 and 4 were connected to EMF and current detection means (not shown). Membrane 1 was sealed into test fixture 2 by O-rings 7 so that there were no gas leakage paths between first gas chamber 8 and second gas chamber 9. In a fuel cell embodiment, these chambers are denoted fuel gas chamber and oxidant gas chamber, while in a hydrogen separation embodiment, they are called pure gas chamber and mixture gas chamber. Tubing (not shown) was connected at the gas inlets as denoted by arrows 10 and 11 to provide gas flow into chambers 8 and 9 and was also connected to the gas outlets as denoted by arrows 12 and 13 to conduct gas away from the chambers. Gas cylinders and gas mixng and flow control apparatus (not shown) were used to provide gas for testing in accordance with the herein described experiments. Several cylinders of hydrogen/nitrogen gas mixtures were purchased; an analysis of the contents was supplied with each cylinder. In some experiments, gas was passed through the test fixture directly from a cylinder and in other cases a blend was prepared from analyzed cylinder gas and pure nitrogen using the gas mixing apparatus. It must be noted that the gas mixing apparatus was capable of accuracy suitable for proof of principle experimentation but not for more rigorous work. Also, no attempt was made to separately analyze the gas mixtures prepared by diluting purchased gas using said gas mixing apparatus.

Gas flows were established through the chambers of the sample cell with both chamber pressures at about one atmosphere, since the chambers were vented directly to atmosphere. One flow was pure hydrogen (hydrogen partial pressure of approximately 1.0 atm.) and the other was alternated between pure hydrogen and about a 10% by volume mixture of hydrogen in nitrogen (hydrogen partial pressure of approximately 0.1 atm.). The voltage across wires 3 and 4 was recorded by means of a standard laboratory strip chart recorder. The voltage versus time plot was a substantially perfect square wave form. Voltage varied consistently between 0.0 millivolts and negative 29.2 mv. Response was Nernstian; the calculated voltage is also 29.2 mv (at a room temperature of about 22° C.). Note that this is open circuit voltage.

When an ammeter was connected to wires 3 and 4, the measured current was about $3 \times 10^{-3}$ ma. This corresponds to a current density of about $3 \times 10^{-3}$ ma/cm$^2$ and a hydrogen flux of $4.1 \times 10^{-5}$ ft$^3$/ft$^2$- hr; both figures being based on the area of the membrane covered by platinum. The resistance of the membrane was measured when 100% hydrogen was flowing through both chambers of the sample cell. It was about $10^4$ ohms for a 30 micron thick membrane with 1 cm$^2$ of platinum on each surface. This applies to a totally dry membrane. When a membrane which had dried for only 18 hours, as mentioned above, was placed under test, the initial resistance was lower. The increase in resistance is due to removal of the water used in the casting process during initial operation of a sensor.

The resistance, amperage, and voltage of a single membrane were monitored over approximately 100 days of continuous testing. Deviation of voltage from the theoretically expected value was always less than 1%. In these tests, the accuracy of the sensor is felt to be limited by the equipment used.

In another series of tests at slightly different temperature, the following representative data was collected. A gas containing hydrogen from analyzed cylinders was passed through a test fixture, as above, the voltage generated was recorded, and a concentration of hydrogen, expressed as partial pressure, was determined from the EMF, using the Nernst equation. Partial pressure are expressed in atmospheres and EMF in millivolts.

| mv | P.P. Fixture | P.P. Analysis |
|---|---|---|
| 1.46 | 0.892 | 0.8973 |
| 28.7 | 0.104 | 0.1034 |
| 57.4 | 0.0107 | 0.0109 |

In experimentation with the fuel cell application using a PVA/orthophosphoric acid membrane with air as the oxidant gas and pure hydrogen as the fuel gas, open circuit voltages consistently in the range of 890 mv were observed. Current density (closed circuit) was about $1 \times 10^{-5}$ amp/cm$^2$. Open circuit voltage behavior is excellent; a typical hydrogen-oxygen fuel cell will display values from 0.6 to 0.85 volts. If pure oxygen had been used as an oxidant gas instead of air, the open circuit voltage would have been higher. No attempts were made to optimize performance.

In addition to platinum, palladium was deposited on membranes for use as catalytic agent. Nernstian voltage response was observed when palladium was used and the strip chart record was indistinguishable from that generated when platinum was used. Other catalytic agents are available and known to those skilled in the art. The catalytic agent need not be electrically conductive; however, then the means for forming electrical connection must be in contact with the catalytic agent over a broad area, to facilitate movement of electrons from sites of the catalytic agent to the electrically conductive substance, or electrode. Areas of membrane which are not adjacent to catalytic agent are not effective in the invention. Hydrogen ions spill over from the catalytic agent to the membrane and then the protons move through the membrane.

It can be seen that a membrane mounted in a cell such as depicted in FIG. 1 may be subjected to high differential pressures which may deform or burst the membrane. A composite membrane may be fabricated by casting a solution prepared as described above on a flexible porous support. A supported membrane assembly may be fabricated by attaching a membrane which is cast and dried as above to a rigid porous support. In the case of a PVA/H$_3$PO$_4$ membrane, attachment is accomplished by moistening the surface of the membrane and support and pressing the moistened surface together. The moisture will evaporate.

It is contemplated that any porous substrate which possesses a structural strength greater than the thin film membrane may be employed. Some examples of these porous supports will include substances such as glass cloth, polysulfone, cellulose acetate, polyamides, ceramics such as alumina, glass, porcelain, etc. which have been fabricated to possess the necessary porosity, etc. The amount of blend which is cast upon the flexible porous support will be that which is sufficient to form a thin film membrane having a thickness within the range herein set forth. After casting, the mutually miscible solvent such as water is removed by conventional means such as normal evaporation or forced evaporation by the application of external heat, application of vacuum, etc., and the desired membrane comprising the thin film blend composited on the porous support may be recovered and utilized in an appropriate gas sensor apparatus.

A polymer blend was prepared by dissolving 0.5 gram of 16,000 molecular weight poly(vinyl alcohol) and 0.2 ml of orthophosphoric acid in boiling deionized water, the amount of organic polymer and acid being sufficient to impart a 63/37 wt. % ratio to the resulting polymer blend. After a period of time sufficient to form the blend had passed, the solution was stirred and poured onto the top of a fine glass cloth which was positioned in a standard Petrie dish. The water was allowed to evaporate for a period of 48 hours and the resulting membrane composite comprising a thin film membrane composited on, or with, the glass cloth having a thickness of 95 microns was recovered.

In like manner, a polymer blend membrane was prepared by dissolving 0.17 cc of sulfuric acid and 0.5 gram of 16,000 molecular weight poly(vinyl alcohol) in boiling deionized water. After a period of time during which a blend had formed, the solution was poured onto the top of a fine glass cloth positioned in a standard Petrie dish. The water was allowed to evaporate during a period of 48 hours and the resulting membrane composite was recovered.

The PVA/H$_3$PO$_4$ composite membrane was cut into a circle having a 1" diameter and platinum electrodes ⅜" in diameter were sputter-dispersed on each side of the membrane. The membrane was then placed in a sample housing similar to that of FIG. 1. A first gas consisting of 100% hydrogen and a second gas comprising 90.013% nitrogen and 9.987% hydrogen were each passed through the two chambers. An EMF of 29.6 mv was measured; this compares to a calculated voltage of 29.5 millivolts at a temperature of 25.3° C. In addition, it was found that the resistivity was $0.375 \times 10^5$ ohm-cm. In a similar manner, the PVA/H$_2$SO$_4$ membrane was tested and the voltage was found to be the same as that when the membrane comprising a blend of poly(vinyl alcohol) and orthophosphoric acid was used. However, the resistivity was higher.

As an illustration of the greater structural strength of the polymer blend composited on a porous solid support as exemplified by the blends of the present invention when compared to unsupported membranes, two polymer blend membranes were prepared. The polymer blend was prepared by dissolving 0.5 gram of poly(vinyl alcohol) having a molecular weight of 16,000 and 0.2 ml of orthophosphoric acid in boiling deionized water. The resulting blend was cast onto a glass cloth having a thickness of 30 microns. A second blend was prepared by admixing like proportions of poly(vinyl alcohol) and orthophosphoric acid and casting the resulting blend onto a Petrie dish without a support. After removal of the solvent, the two membranes were recovered.

Each membrane was placed in a holder which enabled air pressure to be exerted against one side of the membrane while the other side was at atmospheric pressure. When exposed to 5 psig, the unsupported membrane burst at its center in less than 1 minute. At 2 psig another sample of unsupported membrane bulged and was permanently deformed. The composite membrane was subjected to various pressure levels in 5 psig increments with one minute hold time between increases in pressure. It burst at 35 psig, shearing at the edges of the test hole in the holder. The point of failure leads one to believe that holder design caused the shearing and that a higher burst pressure would be observed in a different holder.

A poly(vinyl pyrrolidone)/orthophosphoric acid membrane composited on a fine glass cloth was prepared. The composition was 45 mole percent polymer and 55 mole percent acid. With pure hydrogen and 10% hydrogen flowing, the EMF was 29.1 mv. Current after 24 hours was 0.0076 ma and resistivity was $7.4 \times 10^5$ ohm-cm.

A poly(ethyloxazoline)/orthophosphoric acid membrane composited on a fine glass was prepared. The composition was 50/50, expressed as mole percent. EMF was 29.2 mv with a 10:1 gas ratio. Current was 0.0026 ma and resistivity was $5.2 \times 10^5$ ohm-cm.

Any substance capable of dissociating in the presence of a catalyst to yield hydrogen ions may be the subject of separation in the same manner as is elemental hydrogen. The Nernst equation is applicable; the $E_o$ term is not 0, as it is when the same substance is present on both sides of the membrane, and the partial pressure term of the equation contains the partial pressures of the substances of the reaction, raised to the proper power if more than one molecule of a substance is involved. As examples, certain hydrocarbons come readily to mind as substances which may be hydrogenated or dehydrogenated, these hydrocarbons including cyclopentadiene, 1,3-pentadiene, isoprene, benzene, 2-butene-1,4-diol, n-hexane, cyclohexane, and isoamylene.

In the embodiment of the invention depicted in FIG. 1, when test fixture 2 is used for gas separation, it is necessary that lead 3 be connected to lead 4 by an electrical conduction path. This path permits the electrons resulting from the dissociation of hydrogen (or other gaseous mixture component) at one catalyst portion 5 to travel to the other side of the membrane to combine at the other catalyst portion with hydrogen ions which have passed through the membrane. If means for generating an EMF are inserted into the electrical conduction path, that is, if electrical power from a source external to the separation apparatus is supplied to the apparatus through the means for forming electrical connection such as leads 3 and 4, the rate of removal of hydrogen from the gaseous mixture will increase.

For a practical separation process, the partial pressure of hydrogen in the chamber from which hydrogen is removed, the mixture gas chamber, must be higher than the partial pressure of hydrogen in the chamber in which hydrogen collects after removal, the pure gas chamber. In an industrial application of the invention, a compressor might be used to compress the gaseous mixture from which hydrogen is to be removed, maintaining the hydrogen partial pressure in the mixture gas chamber higher than that in the pure gas chamber. The partial pressure of hydrogen increases as the total pressure is increased. The pure gas chamber might be subjected to a negative pressure, or vacuum, thus removing hydrogen as it collects, or forms. The references to hydrogen partial pressure deal with a case in which hydrogen is the gaseous mixture component which dissociates to form hydrogen ions. If the component is not hydrogen, the equilibrium hydrogen partial pressure associated with the gaseous mixture component must be at a higher value than the partial pressure of hydrogen in the pure gas chamber, where the product gas comprising hydrogen is collected.

It should be noted that the Nernst equation contains a temperature term. Since temperature is a factor in the separation it may be desirable to change the temperature of the gases before the electrochemical reaction takes place.

Figure 2:
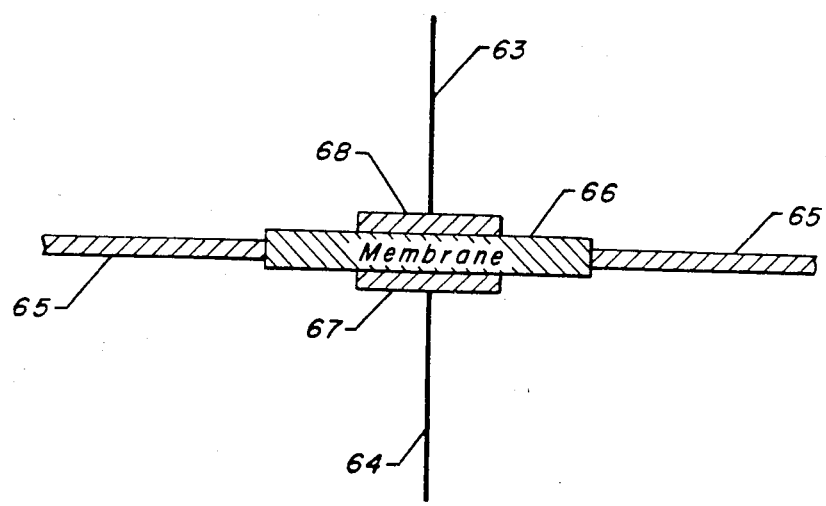
FIG. 2 depicts an embodiment of the invention, in a sectional view, in which a membrane is part of a partition separating a fuel gas chamber from an oxidant gas chamber or a pure gas chamber from a mixture gas chamber.

Referring to FIG. 2, an embodiment of the invention in which a membrane 66 serves as part of partition 65 is shown. Partition 65 separates a mixture gas chamber from a pure gas chamber. Catalytic agents 67 and 68 and wire leads 63 and 64 perform the functions discussed above. Leads 63 and 64 must be connected to one another. Separation apparatus may take many forms; FIG. 2 shows a simple and basic form. A cascade arrangement might be used, in which the gaseous mixture is compressed and then allowed to flow through a plurality of mixture chambers, each at a lower pressure.

The design of fuel cells is well known. Many configurations are possible; FIG. 1 provides an example of one type. FIG. 2 depicts an embodiment of the present invention useful in producing electricity as well as in separation. Partition 65 separates a fuel gas chamber from an oxidant gas chamber. Electrically conductive catalytic agent is present on both sides of membrane 66, as shown by reference numbers 67 and 68. Wire leads 63 and 64 extend to connect to electricity utilizing means (not shown).

Figure 3:
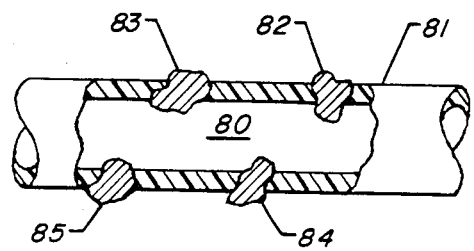
FIG. 3 depicts tubing and particles of one embodiment of the invention in a partial sectional view. It is not to scale.

It may be desirable to use a membrane in the form of tubing, or hollow fibers, instead of in a flat configuration. The advantages are well known to those familiar with such applications and need not be repeated herein. In the embodiment of the invention depicted in FIG. 1, when test fixture 2 is used for gas separation, it is necessary that lead 3 be connected to lead 4 by an electrical conduction path. This path permits the electrons resulting from the dissociation of hydrogen (or other gaseous mixture component) at one catalyst portion 5 to travel to the other side of the membrane to combine at the other catalyst portion with hydrogen ions which have passed through the membrane. It can be seen that certain problems arise in regard to the external circuit and catalyst when it is desired to use tubing rather than a flat membrane. FIG. 3 depicts an embodiment of the invention which solves these problems. A very short section of a hollow fiber, or portion of a single tube, is shown. Electrically conductive particles are contained in and form a portion of the tubing wall, as shown by particles 82, 83, 84, and 85. Each particle has catalytic agent in contact with it. FIG. 3 does not show the catalyst as a separate material. The catalyst material and particle material may be the same substance, such as platinum particles. The catalytic agent may cover only that surface of each particle which is exposed to the interior of the tubing, or in common with the interior surface of the tubing, or exposed to the atmosphere exterior to the tubing. It may cover only a portion of said exposed surface. For the purpose of convenience in fabricating the apparatus, it may cover the entire surface of each particle. A gaseous mixture from which hydrogen is to be separated may be inside the tube in the space 80 or outside the tube, in contact with the tube exterior surface 81. Pure gas is partitioned from the gaseous mixture by the tube walls. As discussed herein, the particles provide the necessary electron path. It is readily seen that a membrane with particles need not be formed into tubing but can also be used for hydrogen separation in the same manner as described above. A particle containing solution can be cast on an appropriate surface as described above.

The particles may be any electrically conductive material compatible with the gases which will bond to the membrane during manufacture of the tubing. Carbonaceous material or metals such as copper may be used. The catalyst material is as discussed above. The tubing may be fabricated by forcing a solution through a die while making provision for maintaining a hollow core, such as by injecting a gas or liquid. The solution is discussed above. It is not necessary to detail manufacturing methods; these are well known to those skilled in the art, as shown by the above-referenced publications. The particles may be added to the solution before the tubes are formed. Catalyst may be placed on the particles before or after the tubing is formed. For example, copper or carbon particles may be coated with platinum by adding chloroplatinic acid and decomposing to leave elemental platinum. Catalytic agent may be added by vapor deposition after the tubing has been formed.

Tubing of outside diameter of approximately 0.001 mm and larger may be formed. The outside diameter may be as large as one-half to one inch when tubing is formed by solution extrusion methods. Tubes may be formed from flat sheets of membrane. Tubes may also be formed over or inside of a support material, such as a perforated pipe or porous tubing. The wall thickness of the tubing will vary depending on the application. The primary consideration here is strength. A thicker wall is required as the operating pressure differential between inside and outside increases. Tubing is normally formed into bundles containing a plurality of separate tubes, means for supplying gaseous mixture and removing hydrogen-depleted gaseous mixture, and means for supplying pure gas, if any is used, and removing hydrogen-rich pure gas. Such a bundle and accompanying supply and removal means is quite similar to the well-known shell and tube heat exchanger.

Sample cell or membrane housing or test fixture refers to a housing or fixture which holds an electrolyte element and other required components. FIG. 1 depicts a membrane housing. Membrane or electrolyte element refers to an ionconducting substance suitable for use an an electrolyte in the concentration cell of this invention which has been formed into a particular physical entity, either with or without additional substances, for use in the invention. Where an electrolyte element surface is referred to as in common with a gas or gas chamber, the meaning is the same as exposed to a gas or gas chamber and such reference does not preclude the presence of catalytic agent and electrodes at or covering the surface. Gas may diffuse through covering material. Gas chamber refers to any space in which gas which is the subject of this electrochemical process exists. The term "gas" is used herein to include vaporized liquids regardless of boiling point characteristics of the substance. As used herein, miscible means capable of being mixed where there may only be a very small degree of solubility. As is familiar to those skilled in the art, the terms concentration and partial pressure are often used interchangeably; partial pressure expresses concentration. A gaseous mixture may be formed in the apparatus by the dissociation of hydrogen when a single compound is charged to the apparatus, such as in the dehydrogenation of a hydrocarbon. A fuel gas may have only one component or more than one. Compatible may be taken to mean that compatible compounds will form the polymer-blend composition of matter.

We claim as our invention:

1. Apparatus for performing an electrochemical process involving a gaseous mixture having a component which is capable, in the presence of a catalytic agent, of dissociating to yield hydrogen ions or of combining with hydrogen ions, comprising:

(a) a thin film macroscopically homogeneous polymer blend membrane possessing a high protonic conductivity and which is formed by removing the solvent from a solution of a phosphoric acid and an organic polymer, wherein said phosphoric acid is present in the blend in an amount in the range of about 10% to about 70% by weight of the blend and is selected from a group consisting of hypophosphoric acid, metaphosphoric acid, orthophosphoric acid, pyrophosphoric acid, and polyphosphoric acid, and wherein said organic polymer is present in the blend in an amount in the range of about 90% to about 30% by weight of the blend and is selected from a group consisting of poly(vinyl alcohol), poly(vinyl fluoride), polyethylenimine, poly(ethylene glycol), cellulose acetate, poly(ethyloxazoline), poly(vinyl sulfonic acid), poly(vinyl pyridine), poly(vinyl pyrrolidone), polyimide, poly(acrylamide), poly(acrylic acid), poly(N-isopropyl acrylamide), poly(N,N-dimethyl acrylamide), and copolymers having as repeat units the monomer units used in the polymers of said group.

(b) a membrane housing comprising a first gas chamber and a second gas chamber separated by a partition comprising said membrane, said membrane having a first surface in common with the first gas chamber and a second surface in common with the second gas chamber;

(c) two separate portions of catalytic agent effective to promote dissociation and combination, a first portion in contact with said first surface and a second portion in contact with said second surface of said membrane; and (d) means for forming electrical connection in operative contact with said catalytic agent at said first surface and with said catalytic agent at said second surface.

2. The apparatus of claim 1 further comprising means to supply fuel gas to one of said gas chambers and oxidant gas to the other of said gas chambers.

3. The apparatus of claim 1 further comprising means to supply said gaseous mixture to one gas of said chambers and to remove pure gas comprising hydrogen from the other of said gas chambers.

4. The apparatus of claim 1 further comprising means for generating an EMF connected between said means for forming electrical connection.

5. The apparatus of claim 1 further characterized in that said catalytic agent comprises a substance selected from a group consisting of platinum, palladium, and alloys thereof.

6. The apparatus of claim 1 further characterized in that said catalytic agent is electrically conductive.

7. The apparatus of claim 1 further characterized in that said catalytic agent is porous to said gaseous component.

8. The apparatus as set forth in claim 1 in which said membrane possesses a thickness of from about 0.1 to about 500 microns.

9. The apparatus as set forth in claim 1 in which said polymer comprises poly(vinyl alcohol) and said acid comprises orthophosphoric acid.

10. The apparatus as set forth in claim 1 in which said blend is composited with a flexible porous support.

11. The apparatus as set forth in claim 1 in which said polymer comprises poly(ethyloxazoline) and said acid comprises orthophosphoric acid.

12. A method for accomplishing an electrochemical process involving a gaseous mixture having a component which is capable, in the presence of a catalytic agent, of dissociating to yield hydrogen ions, such method comprising contacting said gaseous mixture with a first surface of a thin film polymer blend membrane and forming an electrical connection between two separate portions of catalytic agent effective to promote dissociation and combination, wherein a first portion of catalytic agent is in contact with said first surface and a second portion of catalytic agent is in contact with a second surface of said membrane, which membrane isolates said gaseous mixture from a second gas comprising hydrogen compounds formed at said second portion of catalyst, and which membrane has said second surface exposed to the second gas, said membrane comprising a thin film macroscopically homogeneous polymer blend membrane possessing a high protonic conductivity and which is formed by removing the solvent from a solution of a phosphoric acid and an organic polymer, wherein said phosphoric acid is present in the blend in an amount in the range of about 10% to about 70% by weight of the blend and is selected from a group consisting of hypophosphoric acid, metaphosphoric acid, orthophosphoric acid, pyrophosphoric acid, and polyphosphoric acid, and wherein said organic polymer is present in the blend in an amount in the range of about 90% to about 30% by weight of the blend and is selected from a group consisting of poly(vinyl alcohol), poly(vinyl fluoride), polyethylenimine, poly(ethylene glycol), cellulose acetate, poly(ethyloxazoline), poly(vinyl sulfonic acid), poly(vinyl pyridine), poly(vinyl pyrrolidone), polyimide, poly(acrylamide), poly(acrylic acid), poly(N-isopropyl acrylamide), poly(N,N-dimethyl acrylamide), and copolymers having as repeat units the monomer units used in the polymers of said group.

13. The method of claim 12 further characterized in that said electrochemical process comprises producing electricity from a fuel gas comprising said gaseous mixture and an oxidant gas comprising said second gas.

14. The method of claim 12 further characterized in that said electrochemical process comprises separating pure gas comprising hydrogen from said gaseous mixture.

15. Apparatus for separation of hydrogen from a gaseous mixture having a component which is capable, in the presence of a catalytic agent, of dissociating to yield hydrogen ions, comprising:
(a) tubing which is substantially imporous comprised of a thin film macroscopically homogeneous polymer blend membrane possessing a high protonic conductivity and which is formed by removing the solvent from a solution of a phosphoric acid and an organic polymer, wherein said phosphoric acid is present in the blend in an amount in the range of about 10% to about 70% by weight of the blend and is selected from a group consisting of hypophosphoric acid, metaphosphoric acid, orthophosphoric acid, pyrophosphoric acid, and polyphosphoric acid, and wherein said organic polymer is present in the blend in an amount in the range of about 90% to about 30% by weight of the blend and is selected from a group consisting of poly(vinyl alcohol), poly(vinyl fluoride), polyethylenimne, poly(ethylene glycol), cellulose acetate, poly(ethyloxazoline), poly(vinyl sulfonic acid), poly(vinyl pyridine), poly(vinyl pyrrolidone), polyimide, poly(acrylamide), poly(acrylic acid), poly(N-isopropyl acrylamide), poly(N,N-dimethyl acrylamide), and copolymers having as repeat units the monomer units used in the polymers of said group;
(b) a multiplicity of electrically conductive particles contained in and forming portions of the walls of said tubing, each particle having a first surface exposed to the interior of said tubing and a second surface in common with the exterior surface of said tubing;
(c) two portions of catalytic agent effective to promote dissociation and combination associated with each particle, one portion in contact with said first surface and one portion in contact with said second surface of each particle; and
(d) means to maintain said gaseous mixture in contact with one of said tubing surfaces and means to recover hydrogen formed at the other of said tubing surfaces.

16. Apparatus for separation of hydrogen from a gaseous mixture having a component which is capable, in the presence of a catalytic agent, of dissociating to yield hydrogen ions, comprising:
(a) a thin film macroscopically homogeneous polymer blend membrane possessing a high protonic conductivity and which is formed by removing the solvent from a solution of a phosphoric acid and an organic polymer, wherein said phosphoric acid is present in the blend in an amount in the range of about 10% to about 70% by weight of the blend and is selected from a group consisting of hypophosphoric acid, metaphosphoric acid, orthophosphoric acid, pyrophosphoric acid, and polyphosphoric acid, and wherein said organic polymer is present in the blend in an amount in the range of about 90% to about 30% by weight of the blend and is selected from a group consisting of poly(vinyl alcohol), poly(vinyl fluoride), polyethylenimine, poly(ethylene glycol), cellulose acetate, poly(ethyloxazoline), poly(vinyl sulfonic acid), poly(vinyl pyridine), poly(vinyl pyrrolidone), polyimide, poly(acrylamide), poly(acrylic acid), poly(N-isopropyl acrylamide), poly(N,N-dimethyl acrylamide), and copolymers having as repeat units the monomer units used in the polymers of said group;
(b) a membrane housing comprising a first gas chamber and a second gas chamber separated by a partition comprising said membrane, said membrane having a first surface in common with the first gas chamber and a second surface in common with the second gas chamber;
(c) a multiplicity of electrically conductive particles contained in and forming portions of said membrane, each particle having a first surface exposed to said first gas chamber and a second surface exposed to said second gas chamber;

(d) two portions of catalytic agent effective to promote dissociation and combination associated with each particle, one portion in contact with said first surface and one portion in contact with said second surface of each particle;

(e) means to supply said gaseous mixture to said first gas chamber; and, (f) means to recover hydrogen formed in said second gas chamber.

17. A method for separation of hydrogen from a gaseous mixture having a component which is capable, in the presence of a catalytic agent, of dissociating to yield hydrogen ions, such method comprising contacting said gaseous mixture with a first surface of a thin film polymer blend membrane and recovering hydrogen formed at a second surface of said membrane, said membrane having a multiplicity of electrically conductive particles contained in and forming a portion of it, each particle having a first particle surface in common with said first membrane surface and a second particle surface in common with a second surface of said membrane, two portions of catalytic agent effective to promote dissociation and combination are associated with each particle, one portion of catalytic agent in contact with the first particle surface and one portion of catalytic agent in contact with the second particle surface, which membrane isolates said gaseous mixture from a pure gas comprising hydrogen separated from the gaseous mixture, and which membrane has said second surface exposed to the pure gas, said membrane consisting of a thin film macroscopically homogeneous polymer blend membrane possessing a high protonic conductivity and which is formed by removing the solvent from a solution of a phosphoric acid and an organic polymer, wherein said phosphoric acid is present in the blend in an amount in the range of about 10% to about 70% by weight of the blend and is selected from a group consisting of hypophosphoric acid, metaphosphoric acid, orthophosphoric acid, pyrophosphoric acid, and polyphosphoric acid, and wherein said organic polymer is present in the blend in an amount in the range of about 90% to about 30% by weight of the blend and is selected from a group consisting of poly(vinyl alcohol), poly(vinyl fluoride), polyethylenimine, poly(ethylene glycol), cellulose acetate, poly(ethyloxazoline), poly(vinyl sulfonic acid), poly(vinyl pyridine), poly(vinyl pyrrolidine), polyimide, poly(acrylamide), poly(acrylic acid), poly(N-isopropyl acrylamide), poly(N,N-dimethyl acrylamide), and copolymers having as repeat units the monomer units used in the polymers of said group.

* * * * *

UNITED STATES PATENT AND TRADEMARK OFFICE
CERTIFICATE OF CORRECTION

PATENT NO.   : 4,797,185
DATED        : January 10, 1989
INVENTOR(S)  : Anthony J. Polak and Sandra Petty-Weeks It is certified that error appears in the above-identified patent and that said Letters Patent is hereby corrected as shown below:

```
Front page: Assignee: "Morristownship" should read   --Morristown--.
Column 1, line 38:  "Iopnics" should read --Ionics--;
          line 39:  "NorthHolland" should read --North Holland--.
Column 5, line 45:  "A"  should read --a--.
Column 6, line 46:  after "example" insert --,--;
          line 58:  "evaportion" should read --evaporation--.
Column 7, line 4:   "abut" should read --about--;
          line 14:  "acetate orthophosphoric" should read
                    --acetate-orthophosphoric".
Column 8, line 24:  "mixng" should read --mixing--.
Column 9, line 15:  "pressure" should read "pressures".
Column 11, line 21: after "glass" insert --cloth--.
Column 12, line 60: after "tubing" insert --and the surface which is in
                    common with the exterior surface of the tubing,--.
Column 13, line 15: after "is" insert --as--;
           line 48: "for use an" should read --for use as--.
```

Signed and Sealed this

Twenty-sixth Day of September, 1989

Attest:

DONALD J. QUIGG

Attesting Officer

Commissioner of Patents and Trademarks